United States Patent
Hellman

(10) Patent No.: US 8,090,028 B2
(45) Date of Patent: Jan. 3, 2012

(54) VIDEO DEBLOCKING MEMORY UTILIZATION

(75) Inventor: Timothy Hellman, Concord, MA (US)

(73) Assignee: Broadcom Corporation, Irvine, CA (US)

( * ) Notice: Subject to any disclaimer, the term of this patent is extended or adjusted under 35 U.S.C. 154(b) by 1240 days.

(21) Appl. No.: 10/972,931

(22) Filed: Oct. 25, 2004

(65) Prior Publication Data

US 2005/0259744 A1    Nov. 24, 2005

Related U.S. Application Data

(60) Provisional application No. 60/573,284, filed on May 21, 2004.

(51) Int. Cl.
  *H04N 7/12* (2006.01)
(52) U.S. Cl. .................. 375/240.24; 375/240.01
(58) Field of Classification Search ............ 375/240, 375/240.01, 240.12, 240.24, 240.29; 345/422, 345/441; 348/607
  See application file for complete search history.

(56) References Cited

U.S. PATENT DOCUMENTS

| | | | | | |
|---|---|---|---|---|---|
| 5,008,838 | A | * | 4/1991 | Kelleher et al. | 345/422 |
| 5,325,203 | A | * | 6/1994 | Nojima et al. | 348/607 |
| 5,774,130 | A | * | 6/1998 | Horikawa et al. | 345/441 |
| 2004/0228415 | A1 | * | 11/2004 | Wang | 375/240.29 |

* cited by examiner

*Primary Examiner* — Allen Wong
(74) *Attorney, Agent, or Firm* — McAndrews, Held & Malloy, Ltd.

(57) ABSTRACT

Methods and systems for processing pixels are disclosed herein. A first portion of a previously processed plurality of pixels may be buffered. A first portion of a plurality of selected pixels within a current macroblock may be filtered utilizing the buffered first portion of previously processed plurality of pixels. A second portion of the previously processed plurality of pixels may be simultaneously buffered while filtering the first portion of the plurality of selected pixels. The previously processed plurality of pixels may comprise pixels within a macroblock pair adjacent to the top of the current macroblock. The current macroblock may comprise a frame coded macroblock and/or a field coded macroblock. A second portion of the plurality of selected pixels within the current macroblock may be filtered utilizing the buffered second portion of the previously processed plurality of pixels.

39 Claims, 10 Drawing Sheets

VIDEO DEBLOCKING MEMORY UTILIZATION

RELATED APPLICATIONS

This application makes reference to, claims priority to, and claims the benefit of U.S. Provisional Patent Application 60/573,284, filed on May 21, 2004 and entitled "Video Deblocker Memory Utilization," the complete subject matter of which is hereby incorporated herein by reference in its entirety.

This application is related to the following applications, each of which is incorporated herein by reference in its entirety for all purposes:

U.S. patent application Ser. No. 11/000,731 filed Dec. 1, 2004;
U.S. patent application Ser. No. 10/963,677 filed Oct. 13, 2004;
U.S. patent application Ser. No. 10/985,501 filed Nov. 10, 2004;
U.S. patent application Ser. No. 11/112,632 filed Apr. 22, 2005;
U.S. patent application Ser. No. 10/985,110 filed Nov. 10, 2004;
U.S. patent application Ser. No. 10/981,218 filed Nov. 4, 2004;
U.S. patent application Ser. No. 10/965,172 filed Oct. 13, 2004;
U.S. patent application Ser. No. 10/974,179 filed Oct. 27, 2004;
U.S. patent application Ser. No. 10/974,872 filed Oct. 27, 2004;
U.S. patent application Ser. No. 10/970,923 filed Oct. 21, 2004;
U.S. patent application Ser. No. 10/963,680 filed Oct. 13, 2004;
U.S. patent application Ser. No. 11/013,768 filed Dec. 16, 2004;
U.S. patent application Ser. No. 10/986,741 filed Nov. 12, 2004;
U.S. patent application Ser. No. 11/102,389 filed Apr. 8, 2005;
U.S. patent application Ser. No. 11/135,929 filed May 23, 2005; and
U.S. patent application Ser. No. 11/000,676 filed Dec. 1, 2004.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The ITU-H.264 Standard (H.264), also known as MPEG-4, Part 10, and Advanced Video Coding (AVC), may encode a video stream on a frame-by-frame basis, and may encode video frames on a macroblock-by-macroblock basis. The MPEG-4 standard may specify the use of spatial prediction, temporal prediction, discrete cosine transformation (DCT), interlaced coding and/or lossless entropy coding, for example, to compress macroblocks within a video stream.

The MPEG-4 video compression standard may be utilized to encode video information on a macroblock-by-macroblock basis. During encoding of video information utilizing the MPEG-4 standard, for example, prediction error information may be encoded together with prediction mode information, as well as with other side information necessary for the decoding process. In order to encode the prediction error information, a discrete cosine transformation may be applied to transform the prediction error information into frequency domain coefficients prior to encoding. During the encoding and the transformation processes within a video encoder, certain information relating to the prediction error, for example, may be lost.

As a result of the lost or missing information, the quality of the decoded video signal may be decreased. After quantized frequency coefficients are transformed back to prediction error information and a macroblock is reconstructed, certain artifacts may appear in the decoded video stream. More specifically, transform blockiness may appear in the decoded video in the form of square grid artifacts, for example. Artifacts other than blockiness may also appear in the decoded video stream due to missing video information. Transform blockiness may be associated with missing pixel information along one or more horizontal and/or vertical borders, or edges, between neighboring macroblocks.

In video systems utilizing blocks of video information, a video deblocker may be utilized to smooth the visual transition between adjacent video blocks. During a conventional deblocking process, pixels from previously processed, or deblocked, macroblocks may be utilized to deblock one or more portions of pixels within a current macroblock. The previously processed pixels are initially fetched from memory, for example, and then utilized in the processing, or deblocking, of pixels within the current macroblock. However, conventional methods of deblocking a decoded video stream utilized, for example, in an MPEG-4 environment, are time-consuming and inefficient. Conventional methods of deblocking are characterized by long latency periods for fetching previously processed pixels to be utilized in processing pixels within a current macroblock. In this manner, since processing pixels within a current macroblock utilizes less time than fetching the previously processed pixels necessary to deblock the pixels within the current macroblock, a conventional deblocker is inefficient as it experiences idle time while previously processed pixels are being fetched.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Certain embodiments of the invention may be found in a method and system for processing pixels. A first portion of a previously processed plurality of pixels may be buffered. A first portion of a plurality of selected pixels within current macroblock may be filtered utilizing the buffered first portion of previously processed plurality of pixels. A second portion of the previously processed plurality of pixels may be simultaneously buffered while filtering the first portion of the plurality of selected pixels. The previously processed plurality of pixels may comprise pixels within a macroblock pair adjacent to the top of the current macroblock. The current macroblock may comprise a frame coded macroblock and/or a field coded macroblock. A second portion of the plurality of selected pixels within the current macroblock may be filtered utilizing the buffered second portion of the previously processed plurality of pixels.

The filtered first portion of the plurality of selected pixels may be buffered within the current macroblock. The second portion of the plurality of selected pixels within the current macroblock may be simultaneously filtered while buffering the filtered first portion of the plurality of selected pixels within the current macroblock. The buffered first portion of the plurality of selected pixels within the current macroblock may be stored. The filtered second portion of the plurality of selected pixels within the current macroblock may be simultaneously buffered while storing the buffered first portion of the plurality of selected pixels within the current macroblock. The first portion of the previously processed plurality of pixels may be determined for filtering the first portion of the plurality of selected pixels within the current macroblock. A previous portion of a plurality of selected pixels within a previous macroblock may be simultaneously filtered while buffering the first portion of the previously processed plurality of pixels.

Another embodiment of the invention may provide a machine-readable storage, having stored thereon, a computer program having at least one code section executable by a machine, thereby causing the machine to perform the steps as described above for processing pixels.

Aspects of the system may comprise at least one processor that buffers a first portion of a previously processed plurality of pixels. A first portion of a plurality of selected pixels within a current macroblock may be filtered by the processor utilizing the buffered first portion of the previously processed plurality of pixels. The processor may simultaneously buffer a second portion of the previously processed pixels while filtering the first portion of the selected pixels. The previously processed pixels may comprise pixels within a macroblock pair adjacent to the top of the current macroblock. The current macroblock may comprise a frame coded macroblock and/or a field coded macroblock. A second portion of the selected pixels within the current macroblock may be filtered by the processor utilizing the buffered second portion of the previously processed pixels. The filtered first portion of selected pixels may be filtered by the processor within the current macroblock.

The processor may simultaneously filter the second portion of the selected pixels within the current macroblock while buffering the filtered first portion of the selected pixels within the current macroblock. The buffered first portion of the selected pixels within the current macroblock may be stored by the processor. The filtered second portion of the selected pixels within the current macroblock may be simultaneously buffered by the processor while storing the buffered first portion of selected pixels within the current macroblock. The processor may determine the first portion of the previously processed pixels for filtering the first portion of the selected pixels within the current macroblock. A previous portion of a plurality of selected pixels within a previous macroblock may be simultaneously filtered by the processor while buffering the first portion of the previously processed pixels.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the invention may be found in a method and system for processing pixels. More specifically, transform blockiness within a decoded video stream may be reduced by deblocking the decoded video stream. The deblocking may comprise processing pixels on a macroblock-by-macroblock basis in current and/or neighboring macroblocks. In addition, deblocking may comprise processing pixels on a macroblock pair basis. Pixels within a macroblock may be grouped into sub-blocks and the deblocking may be achieved by processing pixels on a sub-block-by-sub-block basis. Transform blockiness along a vertical macroblock edge may be reduced by filtering pixels within the current sub-block together with pixels within a sub-block to the left of the current sub-block. Transform blockiness along a horizontal macroblock edge may be reduced by filtering pixels within the current sub-block together with pixels within a sub-block to the top of the current sub-block.

During deblocking along a vertical edge, a plurality of previously processed pixels may be utilized to deblock pixels within a current macroblock, or a current macroblock pair. In order to increase deblocker efficiency and avoid extended wait periods during deblocking, previously processed pixels may be buffered on-chip, prior to being utilized by a deblocker to deblock pixels within a current macroblock. In this manner, while a deblocker may utilize fetched previously processed pixels during deblocking of pixels within a current macroblock, previously processed pixels that may be required for deblocking of a subsequent macroblock may be simultaneously fetched and buffered in an input buffer, for example. A buffer may also be utilized at the output of a deblocker to ensure a constant flow of deblocked macroblocks to an output memory and/or to a subsequent display engine. For example, a deblocked macroblock may be buffered in an output buffer at the output of a deblocker, or deblocking filter, and a previously deblocked macroblock may be simultaneously transferred from the output buffer and stored in memory for further processing. By utilizing memory resources to fetch and buffer pixels at the input and output of a deblocker, a decoded video stream may be deblocked faster and more efficiently.

Figure 1A:
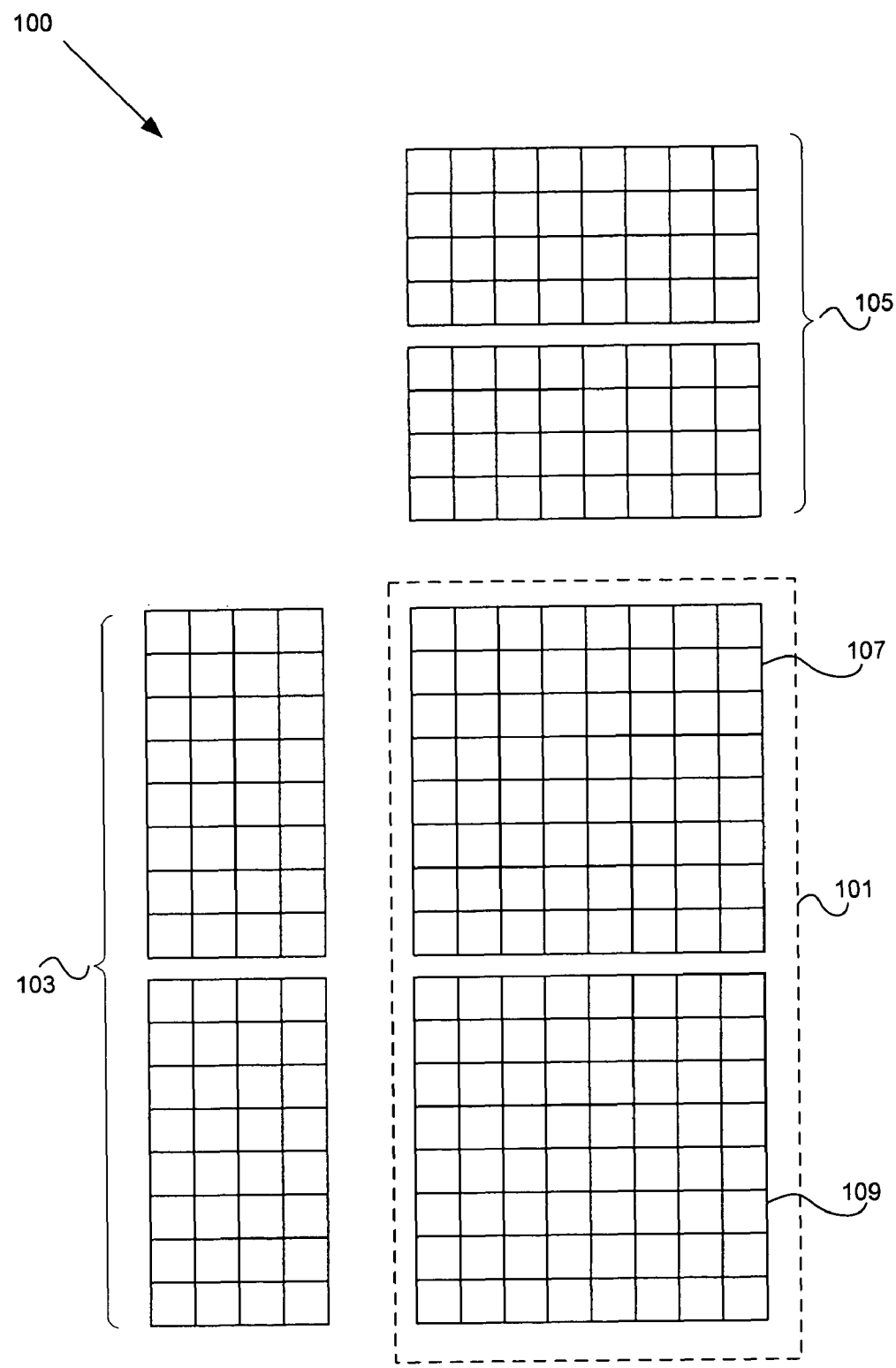
FIG. 1A is a diagram illustrating an exemplary video block and pixel information from adjacent blocks that may be utilized to process pixels within a current macroblock pair, in accordance with an embodiment of the invention.

FIG. 1A is a diagram 100 illustrating an exemplary video block and pixel information from adjacent blocks that may be utilized to process pixels within a current macroblock pair, in accordance with an embodiment of the invention. Referring to FIG. 1A, current macroblock pair 101 may comprise macroblocks 107 and 109. Macroblock pair 103 may be located to the left of current macroblock pair 101 and macroblock pair 105 may be located to the top of current macroblock pair 101. Macroblock pairs 103 and 105 may each comprise a portion of, for example, a 16×16 pixel macroblock.

In one aspect of the invention, during an exemplary deblocking processing scenario, left side pixel information within the current macroblock pair 101 or within a neighboring macroblock may be processed, or filtered, to generate a relatively smooth visual transition at one or more vertical edges within the current macroblock pair 101. The left side pixel information may comprise pixel information within the current macroblock pair 101 and/or pixel information within the macroblock pair 103 located to the left of the current macroblock pair 101. Similarly, top side pixel information within the current macroblock pair 101 or within a neighboring macroblock may be processed, or filtered, to generate a relatively smooth visual transition at one or more horizontal edges within the current macroblock pair 101. The top side pixel information may comprise pixel information within the current macroblock pair 101 and/or pixel information within the macroblock pair 105 located to the top of the current macroblock pair 101.

For example, information for pixels in the left adjacent macroblock pair 103 ("left-side pixels") and information for pixels in the present macroblock pair 101 may be filtered to generate a relatively smooth video transition at the left vertical edge of the present macroblock pair 101. Information for pixels in the top adjacent macroblock pair 105 ("top-side pixels") may be processed with information for pixels in the present macroblock pair 101 to generate a relatively smooth video transition at the top edge of the present macroblock pair 101. More specifically, pixels along the top horizontal edge in macroblock 107 may be deblocked utilizing pixels along one or more bottom horizontal edges of macroblock pair 105. The previously processed pixels along the horizontal edges of macroblock pair 105 may be fetched from memory and buffered within an input buffer, prior to their utilization in the deblocking of the top horizontal edge in the current macroblock 107. During processing of pixels within the current macroblock pair 101, previously processed pixels that are utilized to process pixels within a subsequent macroblock may be simultaneously fetched and buffered in the input buffer.

Figure 1B:
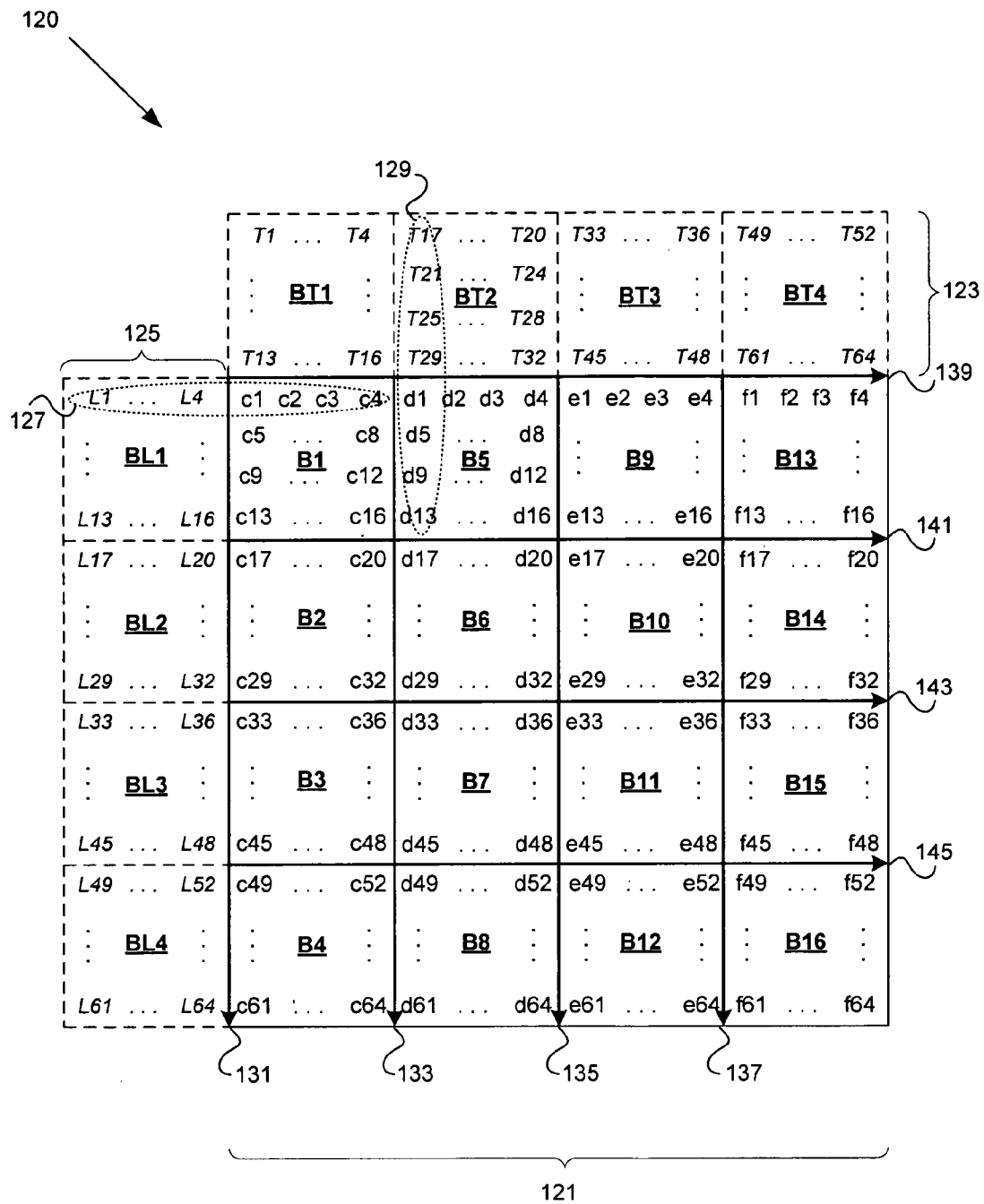
FIG. 1B is a diagram illustrating an exemplary macroblock and adjacent pixels to the top and to the left that may be utilized during deblocking, in accordance with an embodiment of the invention.

FIG. 1B is a diagram 120 illustrating an exemplary macroblock and adjacent pixels to the top and to the left that may be utilized during deblocking, in accordance with an embodiment of the invention. Referring to FIG. 1B, there is illustrated a current macroblock 121, a macroblock portion, or a sub-block, 123 that is adjacent to the top of the current macroblock 121, and a sub-block 125 that is adjacent to the left of the current macroblock 121.

The current macroblock 121 may comprise a plurality of pixels which may be divided into a plurality of 4×4 sub-blocks within the current macroblock 121. For example, the current macroblock may comprise 256 pixels and may be divided into 16 sub-blocks, B1 through B16, each comprising 16 pixels in a 4×4 pixel matrix. The current macroblock 121 may also be divided into a plurality of vertical sub-blocks and a plurality of horizontal sub-blocks. For example, the current macroblock 121 may be divided into four 4×16 pixels vertical sub-blocks comprising any of the following 4×4 sub-block configurations: {B1; B2; B3; B4}, {B5; B6; B7; B8}, {B9; B10; B11; B12} and {B13; B14; B15; B16}. Similarly, current macroblock 121 may also be divided into, for example, four 16×4 pixels horizontal sub-blocks comprising any of the following 4×4 sub-block configurations: {B1; B5; B9; B13}, {B2; B6; B10; B14}, {B3; B7; B11; B15} and {B4; B8; B12; B16}.

The macroblock portion 123 may comprise a 16×4 pixels horizontal sub-block. The horizontal sub-block 123 may comprise 4×4 pixels sub-blocks BT1, BT2, BT3 and BT4 that are adjacent to the top of sub-blocks B1, B5, B9 and B13, respectively. Similarly, the macroblock portion 125 may comprise a 4×16 pixels vertical sub-block. The vertical sub-block 125 may comprise 4×4 pixels sub-blocks BL1, BL2, BL3 and BL4 that are adjacent to the left of sub-blocks B1, B2, B3 and B4, respectively.

In accordance with an aspect of the invention, macroblock 121 may be deblocked by filtering pixels along the vertical edges 131, 133, 135 and 137 of the current macroblock 121, as well as by filtering pixels along the horizontal edges 139, 141, 143 and 145 of the current macroblock 121. More specifically, groups of pixels from neighboring sub-blocks on both sides of a horizontal or vertical edge may be filtered in one operational cycle. Deblocking of the entire macroblock 121 may be achieved by first deblocking along vertical edges 131, 133, 135 and 137, and deblocking along horizontal edges 139, 141, 143 and 145.

During deblocking along the first vertical edge 131, groups of four pixels in each of the sub-blocks B1, B2, B3 and B4 may be filtered together with corresponding groups of four pixels from each of the left adjacent sub-blocks BL1, BL2, BL3 and BL4, respectively. In this manner, horizontal pixel groups comprising pixels on both sides of the vertical edge 131 may be filtered to deblock along the vertical edge 131. For example pixels {c1; c2; c3; c4} from sub-block B1 may be grouped with pixels {L1; L2; L3; L4} to form a horizontal pixel group 127. Since each of the sub-blocks B1, B2, B3 and B4 comprise 16 pixels, a total of 16 horizontal pixel groups may be utilized and filtered to deblock along the vertical edge 131.

During deblocking along any of the remaining vertical edges 133, 135 and/or 137, horizontal pixel groups within the current macroblock 121 may be filtered to deblock along these vertical edges. For example, with regard to deblocking along the second vertical edge 133, horizontal pixel groups may be formed by grouping four horizontally spaced pixels in each of the sub-blocks B5, B6, B7 and B8 with corresponding four horizontally spaced pixels in each of the left adjacent sub-blocks B1, B2, B3 and B4, respectively. Similarly, with regard to deblocking along vertical edge 135, horizontal pixel groups may be formed by grouping four horizontally spaced pixels in each of the sub-blocks B9, B10, B11 and B12 with corresponding four horizontally spaced pixels in each of the left adjacent sub-blocks B5, B6, B7 and B8, respectively.

With regard to deblocking along vertical edge 137, horizontal pixel groups may be formed by grouping four horizontally spaced pixels in each of the sub-blocks B13, B14, B15 and B16 with corresponding four horizontally spaced pixels in each of the left adjacent sub-blocks B9, B10, B11 and B12, respectively.

After deblocking along the vertical edges 131, 133, 135 and 137, the current macroblock 121 may be deblocked along the horizontal edges 139, 141, 143 and 145. During deblocking along the first horizontal edge 139, groups of four pixels in each of the sub-blocks B1, B5, B9 and B13 may be filtered together with corresponding groups of four pixels from each of the top adjacent sub-blocks BT1, BT2, BT3 and BT4, respectively. In this manner, vertical pixel groups comprising pixels on both sides of the horizontal edge 139 may be filtered to deblock along the horizontal edge 139. For example, pixels {d1; d5; d9; d13} from sub-block B5 may be grouped with pixels {T17; T21; T25; T29} to form a vertical pixel group 129. Since each of the sub-blocks B1, B5, B9 and B13 comprise 16 pixels, a total of 16 vertical pixel groups may be utilized and filtered to deblock along the horizontal edge 139.

In one aspect of the invention, one or more portions of previously processed pixels within the top adjacent sub-blocks BT1, BT2, BT3 and BT4 may be buffered in an input buffer prior to their utilization for deblocking along the horizontal edge 139. For example, pixels {T17; T21; T25; T29} may be buffered prior to being filtered by a deblocker together with pixels {d1; d5; d9; d13} to deblock along horizontal edge 139. In accordance with another aspect of the invention, a buffer may also be utilized after deblocking of a horizontal edge within a current macroblock. For example, deblocked pixels along the horizontal edge 139 may be stored in an output buffer. Deblocked pixels along the horizontal edge 141 may be simultaneously buffered in the output buffer while the buffered deblocked pixels along horizontal edge 139 may be communicated and stored within memory, for example on-chip memory, for further processing.

During deblocking along any of the remaining horizontal edges 141, 143 and/or 145, vertical pixel groups within the current macroblock 121 may be filtered to deblock along the horizontal edges. For example, with regard to deblocking along the second horizontal edge 141, vertical pixel groups may be formed by grouping four vertically spaced pixels in each of the sub-blocks B2, B6, B10 and B14 with corresponding four vertically spaced pixels in each of the top adjacent sub-blocks B1, B5, B9 and B13, respectively. Similarly, with regard to deblocking along horizontal edge 143, vertical pixel groups may be formed by grouping four vertically spaced pixels in each of the sub-blocks B3, B7, B11 and B15 with corresponding four vertically spaced pixels in each of the top adjacent sub-blocks B2, B6, B10 and B14, respectively. With regard to deblocking along horizontal edge 145, vertical pixel groups may be formed by grouping four vertically spaced pixels in each of the sub-blocks B4, B8, B12 and B16 with corresponding four vertically spaced pixels in each of the top adjacent sub-blocks B3, B7, B11 and B15, respectively.

In one aspect of the invention, pixels within the current macroblock 121 may be filtered on a pixel group by pixel group basis. For example, eight pixels within each vertical or horizontal pixel groups may be filtered during one operational cycle of deblocking. One operational cycle of deblocking may correspond to one clock cycle in a deblocking system, such as the deblocking system described on FIG. 3.

Figure 2A:
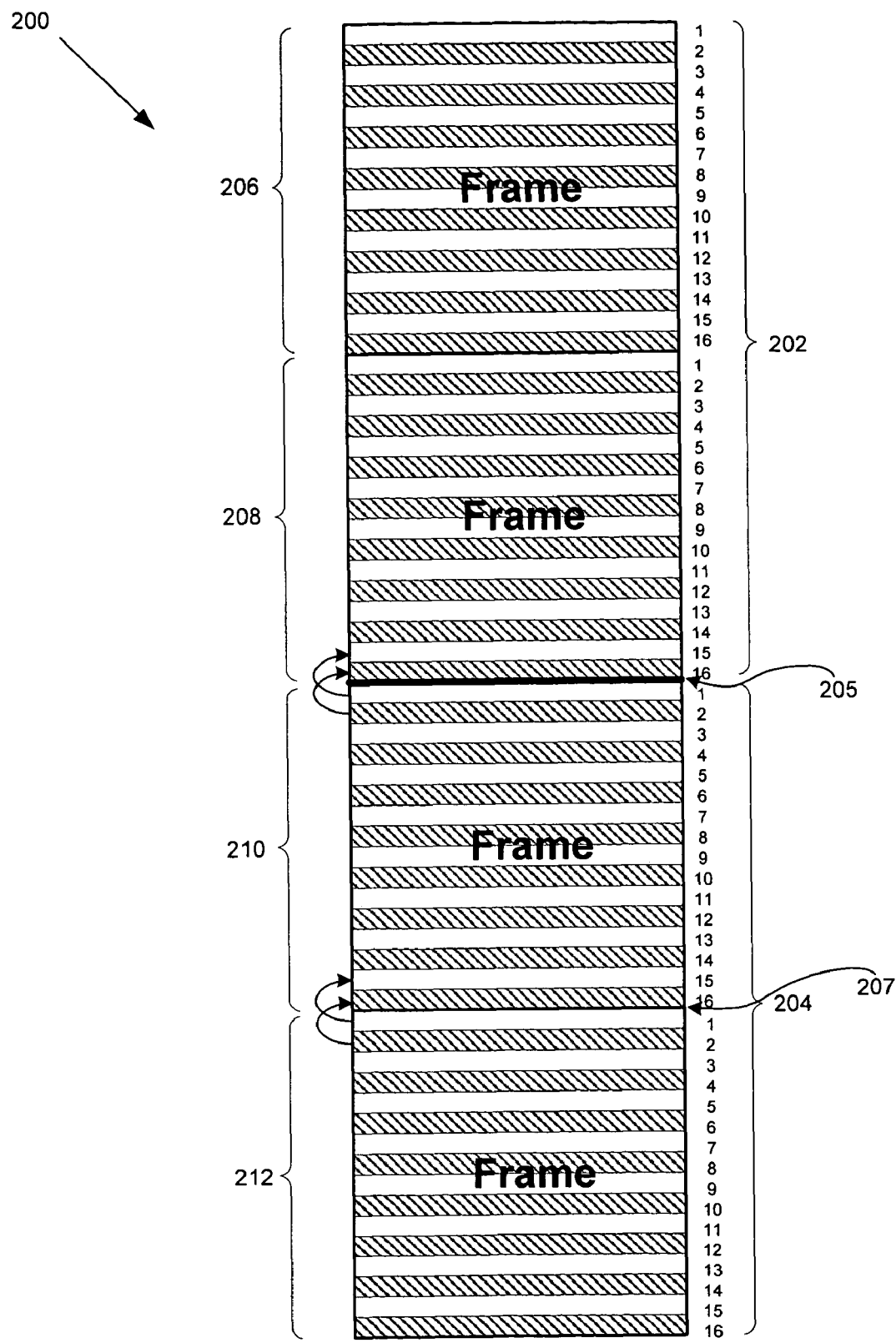
FIG. 2A is a diagram illustrating pixel processing along a horizontal edge between pixels in a frame coded current macroblock pair and a frame coded top neighboring macroblock pair, in accordance with an embodiment of the invention.

FIG. 2A is a diagram 200 illustrating pixel processing along a horizontal edge between pixels in a frame coded current macroblock pair and a frame coded top neighboring macroblock pair, in accordance with an embodiment of the invention. Referring to FIG. 2A, there is illustrated a current macroblock pair 204 and a previous macroblock pair 202, which is adjacent to the top of the current macroblock pair 204 along its horizontal edge 205. Macroblock pair 204 may comprise macroblocks 210 and 212, and macroblock pair 202 may comprise macroblocks 206 and 208.

In one aspect of the invention, each macroblock 206, 208, 210 and 212 may be frame coded during encoding, in accordance with macroblock adaptive frame/field (MBAFF) encoding techniques. MBAFF encoding is more fully described in U.S. patent application Ser. No. 10/963,677 filed Oct. 13, 2004, which is incorporated herein by reference in its entirety. For example, all macroblocks 206, 208, 210 and 212 may be frame coded during encoding and pixels in all odd and even numbered rows may be of the same type. Since macroblocks 208 and 210 are both frame coded, deblocking of pixels within the current macroblock 210 may utilize pixels within corresponding pixel lines within the top adjacent macroblock 208.

For example, deblocking along the horizontal edge 205 may comprise filtering pixels within horizontal line 1 in macroblock 210 with corresponding pixels within pixel line 15 in macroblock 208. Deblocking along the horizontal edge 205 may also comprise filtering pixels within horizontal line 2 in macroblock 210 with corresponding pixels within pixel line 16 in macroblock 208. In this manner, previously processed pixels within horizontal lines 15 and 16 in macroblock 208 may be fetched from memory and buffered prior to being filtered together with corresponding pixels within pixel lines 1 and 2, respectively, in macroblock 210 to deblock along horizontal edge 205.

Similarly, deblocking pixels along the horizontal edge 207 may comprise filtering pixels within horizontal line 1 in macroblock 212 with corresponding pixels within pixel line 15 in macroblock 210. Deblocking along the horizontal edge 207 may also comprise filtering pixels within horizontal line 2 in macroblock 212 with corresponding pixels within pixel line 16 in macroblock 210.

Figure 2B:
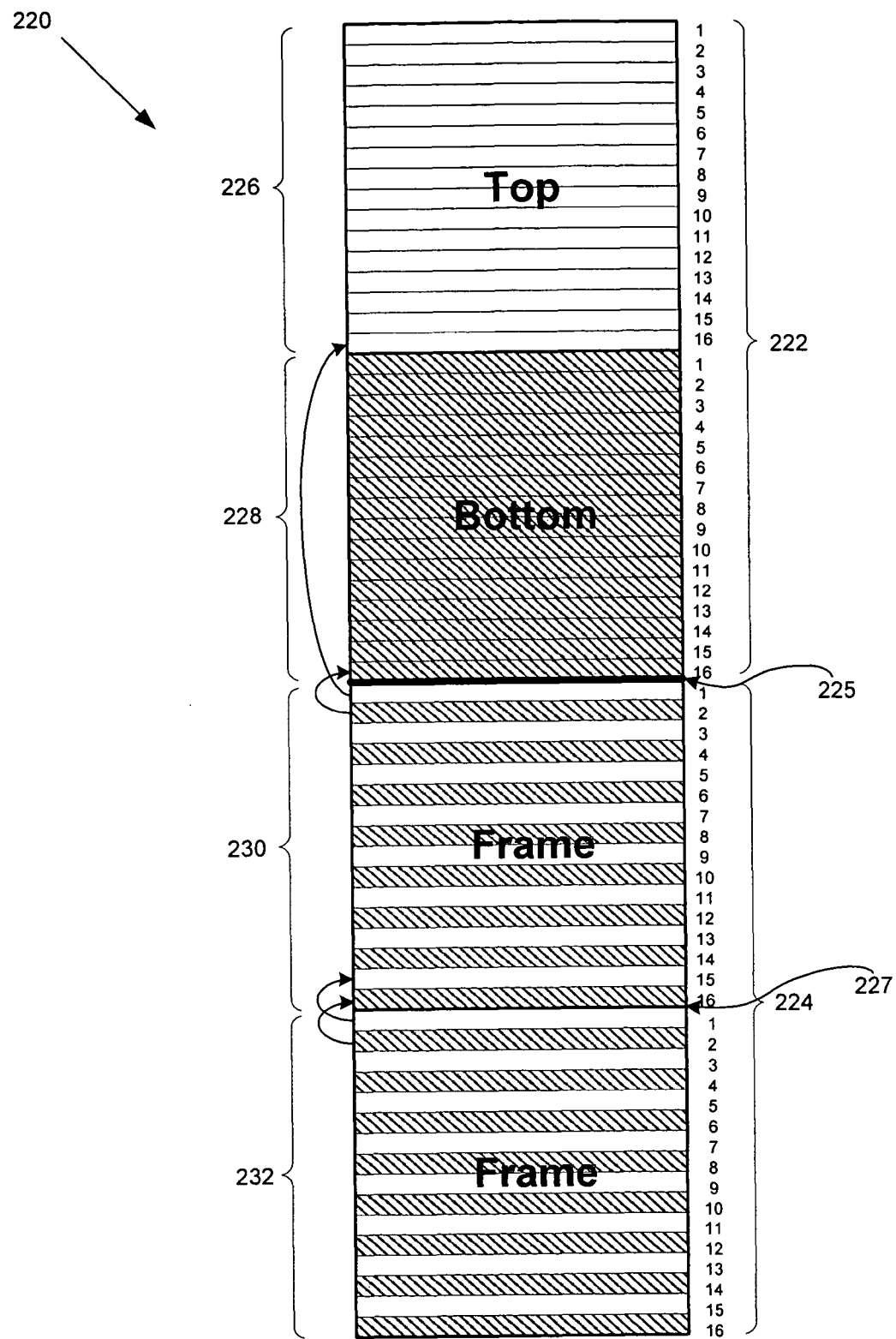
FIG. 2B is a diagram illustrating pixel processing along a horizontal edge between pixels in a frame coded current macroblock pair and a top-bottom field coded top neighboring macroblock pair, in accordance with an embodiment of the invention.

FIG. 2B is a diagram 220 illustrating pixel processing along a horizontal edge between pixels in a frame coded current macroblock pair and a top-bottom field coded top neighboring macroblock pair, in accordance with an embodiment of the invention. Referring to FIG. 2B, there is illustrated a current macroblock pair 224 and a previous macroblock pair 222, which is adjacent to the top of the current macroblock pair 224 along its horizontal edge 225. Macroblock pair 224 may comprise macroblocks 230 and 232, and macroblock pair 222 may comprise macroblocks 226 and 228.

In one aspect of the invention, macroblock 226 may be encoded with a top field and macroblock 228 may be encoded as a bottom field during MBAFF encoding. In addition, macroblocks 230 and 232 may both be frame encoded during MBAFF encoding. Since macroblocks 228 and 230 are bottom field coded and frame coded, respectively, deblocking of pixels within the current macroblock 230 may utilize corresponding top and bottom encoded pixels within corresponding pixel lines within the top adjacent macroblocks 226 and 228.

For example, deblocking along the horizontal edge 225 may comprise filtering pixels within horizontal line 1 in macroblock 230 with corresponding pixels within the preceding top-encoded pixel line 16 in macroblock 226. Deblocking along the horizontal edge 225 may also comprise filtering pixels within horizontal line 2 in macroblock 230 with corresponding pixels within the preceding bottom-encoded pixel line 16 in macroblock 228. In this manner, previously processed pixels within horizontal lines 16 in both macroblocks 226 and 228 may be fetched from memory and buffered prior to being filtered together with corresponding pixels within pixel lines 1 and 2 in macroblock 230 to deblock along horizontal edge 225.

Similarly, deblocking of pixels along the horizontal edge 227 may comprise filtering pixels within horizontal line 1 in macroblock 232 with corresponding pixels within pixel line 15 in macroblock 230. Deblocking along the horizontal edge 227 may also comprise filtering pixels within horizontal line 2 in macroblock 232 with corresponding pixels within pixel line 16 in macroblock 230.

Figure 2C:
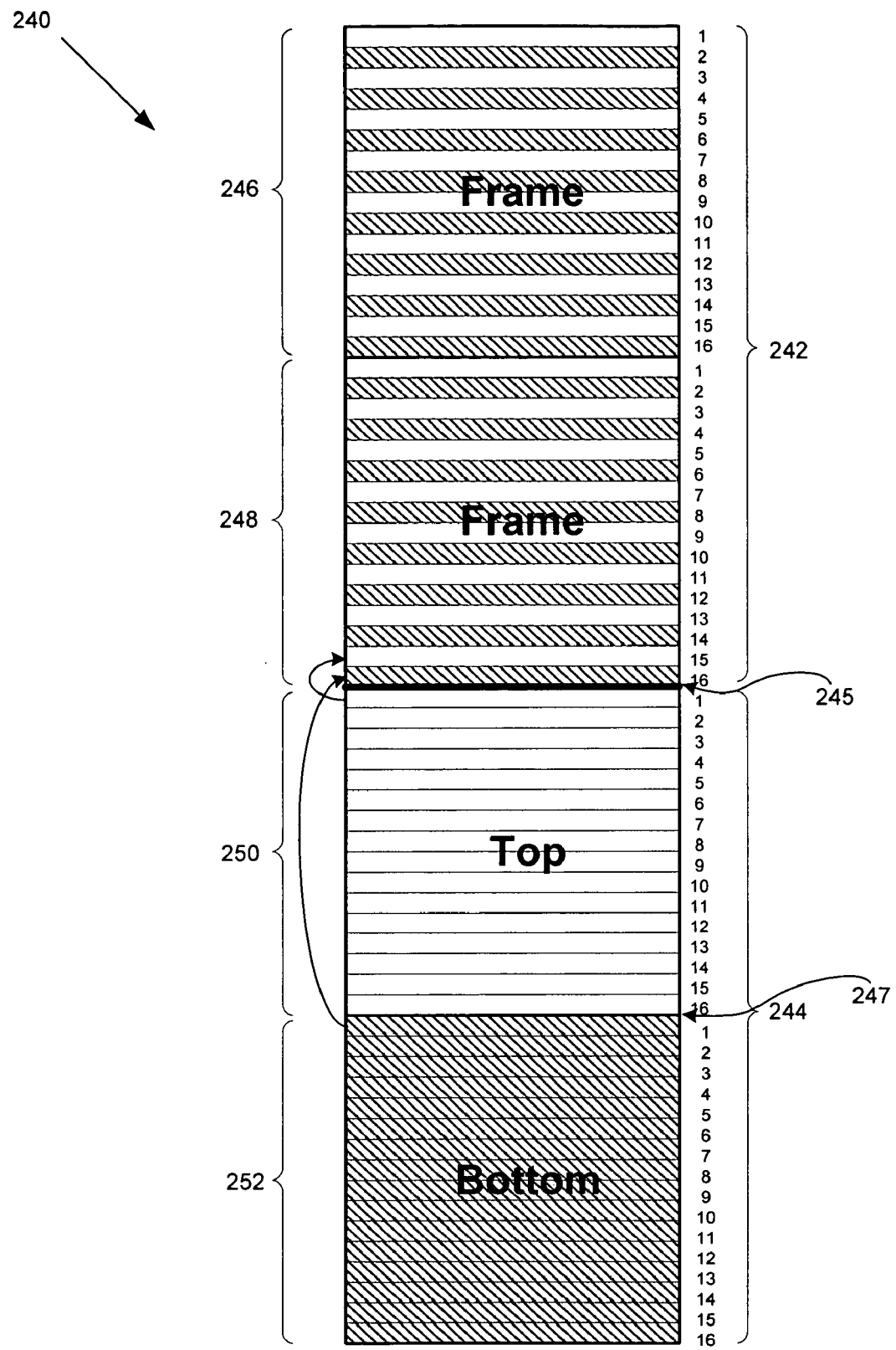
FIG. 2C is a diagram illustrating pixel processing along a horizontal edge between pixels in a top-bottom field coded current macroblock pair and a frame coded top neighboring macroblock pair, in accordance with an embodiment of the invention.

FIG. 2C is a diagram 240 illustrating pixel processing along a horizontal edge between pixels in a top-bottom field coded current macroblock pair and a frame coded top neighboring macroblock pair, in accordance with an embodiment of the invention. Referring to FIG. 2C, there is illustrated a current macroblock pair 244 and a previous macroblock pair 242, which is adjacent to the top of the current macroblock pair 244 along its horizontal edge 245. Macroblock pair 244 may comprise macroblocks 250 and 252, and macroblock pair 242 may comprise macroblocks 246 and 248.

In one aspect of the invention, macroblock 250 may be encoded with a top field and macroblock 252 may be encoded with a bottom field during MBAFF encoding. In addition, macroblocks 246 and 248 may both be frame encoded during MBAFF encoding. Since macroblocks 248 and 250 are frame coded and top field coded, respectively, deblocking of pixels within the current macroblock 250 may utilize corresponding top encoded pixels within the top adjacent macroblock 248.

For example, deblocking along the horizontal edge 245 may comprise filtering pixels within horizontal line 1 in macroblock 250 with corresponding pixels within the preceding top-encoded pixel line 15 in macroblock 248. Previously processed pixels within horizontal line 15 in macroblock 248 may be fetched from memory and buffered prior to being filtered together with corresponding pixels within pixel line 1 in macroblock 250 to deblock along horizontal edge 245.

Similarly, deblocking pixels along the horizontal edge 247 may comprise filtering pixels within horizontal line 1 in macroblock 252 with corresponding pixels within the preceding bottom-encoded pixel line 16 in macroblock 248. Previously processed pixels within horizontal line 16 in macroblock 248 may be fetched from memory and buffered prior to being filtered together with corresponding pixels within pixel line 1 in macroblock 252 to deblock along horizontal edge 247.

Figure 2D:
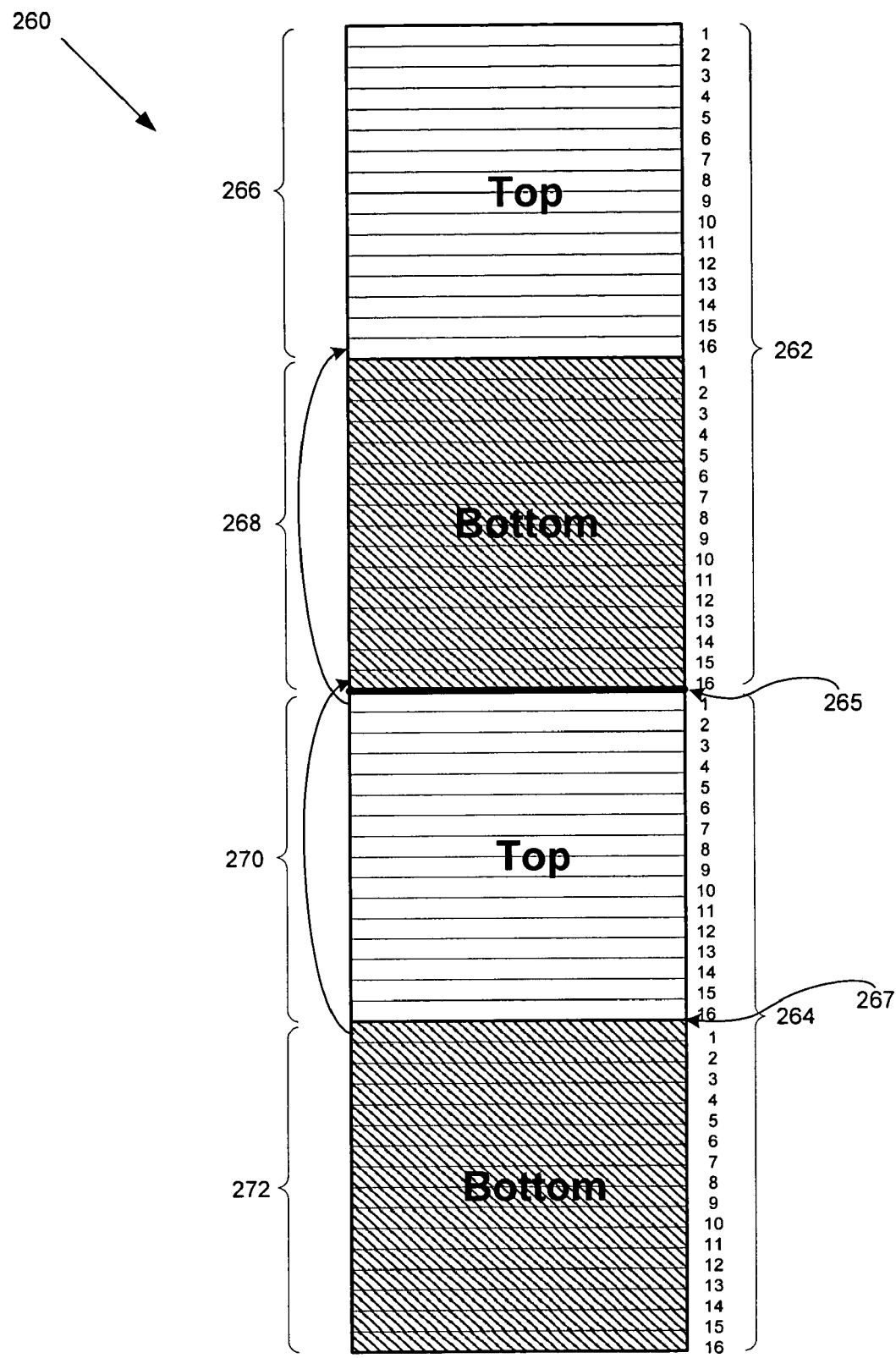
FIG. 2D is a diagram illustrating pixel processing along a horizontal edge between pixels in a top-bottom field coded current macroblock pair and a top-bottom field coded top neighboring macroblock pair, in accordance with an embodiment of the invention.

FIG. 2D is a diagram 260 illustrating pixel processing along a horizontal edge between pixels in a top-bottom field coded current macroblock pair and a top-bottom field coded top neighboring macroblock pair, in accordance with an embodiment of the invention. Referring to FIG. 2D, there is illustrated a current macroblock pair 264 and a previous macroblock pair 262, which is adjacent to the top of the current macroblock pair 264 along its horizontal edge 265. Macroblock pair 264 may comprise macroblocks 270 and 272, and macroblock pair 262 may comprise macroblocks 266 and 268.

In one aspect of the invention, macroblock 270 may be encoded with a top field and macroblock 272 may be encoded with a bottom field during MBAFF encoding. In addition, macroblock 266 may be encoded with a top field and macroblock 268 may be encoded with a bottom field during MBAFF encoding. Since macroblock pairs 262 and 264 are field coded, deblocking of pixels within the macroblocks 270 and 272 may utilize corresponding top-encoded and bottom-encoded pixels within the top adjacent macroblocks 266 and 268, respectively.

For example, deblocking along the horizontal edge 265 may comprise filtering pixels within horizontal line 1 in macroblock 270 with corresponding pixels within the preceding top-encoded pixel line 16 in macroblock 266. Previously processed pixels within horizontal line 16 in macroblock 266 may be fetched from memory and buffered prior to being filtered together with corresponding pixels within pixel line 1 in macroblock 270 to deblock along horizontal edge 265.

Similarly, deblocking of pixels along the horizontal edge 267 may comprise filtering pixels within horizontal line 1 in macroblock 272 with corresponding pixels within the preceding bottom-encoded pixel line 16 in macroblock 268. Previously processed pixels within horizontal line 16 in macroblock 268 may be fetched from memory and buffered prior to being filtered together with corresponding pixels within pixel line 1 in macroblock 272 to deblock along horizontal edge 267.

Figure 3:
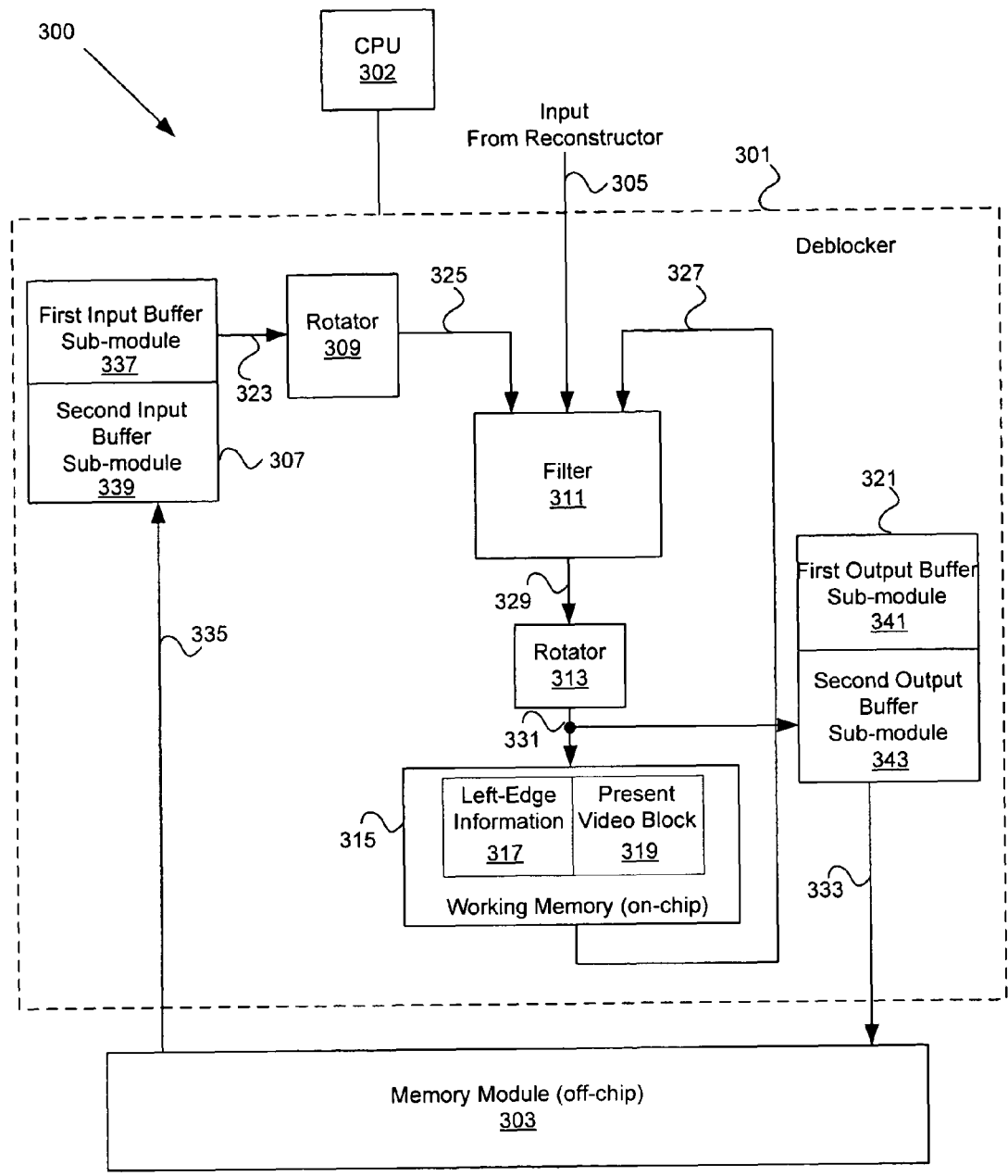
FIG. 3 is a block diagram illustrating an exemplary system for processing pixels within a current macroblock, in accordance with an embodiment of the invention.

FIG. 3 is a block diagram illustrating an exemplary system 300 for processing pixels within a current macroblock, in accordance with an embodiment of the invention. Referring to FIG. 3, the exemplary system for processing pixels 300 may comprise a central processing unit (CPU) 302, a deblocker 301 and a memory module 303. The deblocker 301 may comprise an input buffer 307, rotators 309 and 313, a filter 311, an output buffer 321 and working memory 315. The CPU 302 may be utilized within the system 300 to coordinate the deblocking process within the deblocker 301, for example.

The input buffer 307 comprises suitable circuitry, logic and/or code and may be adapted to buffer a plurality of pixels from a macroblock that is adjacent to the top of a current macroblock. Referring to FIGS. 1B and 3, the input buffer 307 may buffer pixels within the 16×4 horizontal pixel block comprising sub-blocks BT1, BT2, BT3 and BT4. In this manner, the input buffer 307 may be adapted to buffer four pixel lines to the top of the first horizontal edge of a current macroblock. The input buffer 307 may acquire the necessary pixels 335 within the top adjacent 16×4 horizontal pixel block from the memory module 303.

In another aspect of the invention, the input buffer 307 may comprise a first input buffer sub-module 337 and a second input buffer sub-module 339 so that when information in the first input buffer sub-module 337 is being utilized by the filter 311 to deblock a present macroblock, information to be utilized to deblock a subsequent second macroblock may be loaded from the memory module 303 to the second input buffer sub-module 339 in preparation for deblocking the next macroblock.

While the filter 311 may be utilizing preceding pixel information from the first input buffer sub-module 337 to deblock a first macroblock, information to be utilized in deblocking a subsequent second macroblock may be loaded from the second input buffer sub-module 339 to the first input buffer sub-module 337 in preparation for processing the subsequent second macroblock. While the filter 311 is utilizing video information initially stored in the second input buffer sub-module 339 to deblock the second macroblock, information to be utilized in deblocking a third macroblock may be simultaneously loaded from the memory module 303 to the second input buffer sub-module 339 of the input buffer 307.

The rotator 309 comprises suitable circuitry, logic and/or code and may be adapted to rotate the plurality of pixels 323 acquired from the input buffer 307 prior to filtering by the filter 311. The filter 311 may be adapted to filter only pixels that are horizontally adjacent to each other. In this manner, pixels from a top adjacent horizontal block that may be stored in the input buffer 307 may be rotated 90 degrees so that the filter 311 may accept and filter the pixels from the top adjacent horizontal pixel block. After rotation, the rotator 309 may communicate the rotated pixels 325 from the top adjacent horizontal pixel block to the filter 311 for deblocking.

The filter 311 comprises suitable circuitry, logic and/or code and may be adapted to filter a plurality of pixels along one or more horizontal and/or vertical edges within a current macroblock during deblocking. Depending on whether the deblocker 301 is deblocking along a vertical edge and/or a horizontal edge and the location of the currently deblocked edge, the filter 311 may acquire a plurality of pixels 305 from, for example, a reconstructor, pixels 325 from the rotator 309 and/or pixels 327 from the working memory 315. Pixels 305 from a macroblock reconstructor may be processed as pixels within a current macroblock. Pixels 327 may comprise pixels from a macroblock adjacent to the left of the current macroblock and may be utilized during deblocking of a vertical edge within the current macroblock.

The rotator 313 comprises suitable circuitry, logic and/or code and may be adapted to rotate the plurality of filtered pixels 329 acquired from the filter 311. In addition, the rotator 313 may be adapted to process 4 pixels in each clock cycle. During deblocking of a current macroblock, pixels along vertical edges may be initially processed. After pixels along the vertical edges are filtered by the filter 311, the rotator 313 may be utilized to rotate the filtered pixels 329 so that the rotated pixels 331 may be subsequently utilized for deblocking along horizontal edges. Intermediate pixel results, such as the rotated pixels 331, may be stored in the working memory 315 and then communicated back to the filter 311 as pixels 327. After the filter 311 deblocks along all horizontal edges within the current macroblock, the rotator 313 may be utilized again to rotate the filtered pixels back to their original horizontal position. The twice-rotated filtered pixels may then be communicated to the output buffer 321 for buffering and subsequent communication to the memory module 303.

The output buffer 321 comprises suitable circuitry, logic and/or code and may be adapted to receive output video information from the rotator 313, which the output buffer 321 may then store back in the memory module 303. The output buffer 321 may comprise a first output buffer sub-module 341 and a second output buffer sub-module 343. During deblocking, pixels within a deblocked current macroblock may be buffered in the first output buffer sub-portion 341. The second output buffer sub-portion 343 may be utilized to buffer pixels from a deblocked preceding macroblock. While deblocked pixels within a current macroblock are being buffered in the first output buffer sub-portion 341, deblocked pixels from a preceding macroblock buffered in the second output buffer sub-portion 343 may be simultaneously communicated and stored in the memory module 303 via the connection 333. In this manner, the deblocker 301 may supply a constant and uninterrupted flow of deblocked pixels that may be stored in the memory module 303 for further processing.

The working memory 315 may be utilized by the deblocker 301 to store information of the macroblock presently being processed. The working memory 315 may, for example, comprise a first portion 319 for the storage of a present macroblock, or a sub-block, information and a second portion 317 for the storage of pixel information for macroblocks, or sub-blocks, that are adjacent to the left of the current macroblock, or sub-block. The working memory 315 may, for example, comprise static random access memory (SRAM) that may be local to the deblocker 301. For example and without limitation, the working memory 315 may comprise a standard form of memory or may comprise a memory structure specifically adapted to interface with the filter 311 or other portions of the deblocker 301. Accordingly, the scope of various aspects of the present invention should not be limited by characteristics of a particular memory structure.

Storage in the working memory 315 may be implemented in a variety of ways. For example and without limitation, information of a previous macroblock that may be utilized with information of a current macroblock for deblock processing may be moved to a sub-section of working memory 315 reserved for such information. Such a memory subsection may, for example, comprise a standard form of memory or a memory structure specifically adapted to enhance deblock processing. Alternatively, for example, working memory 315 may be divided in a plurality of sub-sections for receiving incoming macroblock information for processing. In such a scenario, information of the processed previous macroblock may be retained at its current location in a first sub-section, for example memory portion 317, while information of the current macroblock may be loaded in second sub-section of working memory, for example memory portion 319.

When the deblocker 301 no longer utilizes information of the preceding macroblock and information of a post-current macroblock arrives, such information may be stored in the first sub-section in the working memory 315, formerly occupied by information of the preceding macroblock. In this manner, the working memory 315 may store information of a processed preceding macroblock in anticipation of a need to utilize such information to process a present macroblock. Accordingly, the scope of various aspects of the present invention should not be limited by characteristics of a particular buffer memory management technique.

The memory module 303 comprises suitable circuitry and/or logic and may be adapted to store previously processed macroblock information that may be utilized to perform further processing, such as displaying of deblocked video information and/or deblocking of a subsequent macroblock. The memory module 303 may, for example, comprise various types of memory, such as off-chip dynamic random access memory (DRAM). During deblocking, processed video information may, for example, be stored back in the memory module 303 to be utilized in subsequent processing activities, such as for deblocking subsequent macroblocks.

In operation, the deblocker 301 may initially deblock along the left most vertical edge within a current macroblock. Pixels within the current macroblock may be acquired as input pixels 305 from an upstream video processor, such as a reconstructor. Pixel information 327 for a left adjacent macroblock may be communicated from the working memory 315 to the filter 311. After the filter 311 completes deblocking along the first vertical edge, filtered information 329 may be rotated by the rotator 313 and the rotated pixel information 331 may be stored within the working memory 315 for use during deblocking of horizontal edges. After deblocking all vertical edges within the current macroblock, the deblocker 301 may proceed with deblocking the horizontal edges. Pixel information 335 for a horizontal pixel block adjacent to the top of the current macroblock may be communicated from the memory module 303 to the input buffer 307.

The buffered pixel information 323 may then be rotated by the rotator 309 and communicated as rotated pixel information 325 to the filter 311. The filter 311 may utilize the rotated pixel information 325 to deblock along the first horizontal edge. The filtered pixels 329 may be rotated again by the rotator 313 and buffered in the output buffer 321 for further processing, such as storing in the memory module 303. With regard to deblocking along the remaining horizontal edges, the filter 311 may utilize rotated pixel information 327 already stored in the working memory 315 during deblocking of the vertical edges. In this manner, a single vertical or horizontal edge in a 16×16 macroblock may be deblocked during 16 operational cycles, or a total of 128 operational cycles for each macroblock.

During an exemplary deblocking processing scenario, the deblocker 301 may, for example, have performed deblocking processing on a previous macroblock. Such processing may have resulted in at least a portion of a preceding macroblock being deblocked. Information of the preceding macroblock may, for example, be utilized in deblocking a current macroblock. For example, the right side pixels of a left preceding macroblock and the left side pixels of the current macroblock may be deblocked together within the filter 311. Accordingly, at least a portion of the preceding macroblock may be stored in the working memory 315, more specifically in the second memory portion 317 for left adjacent pixel information.

Information for a present macroblock may be acquired as input 305 from a reconstructor, or as a result of another upstream processing, such as decrypting, decoding, scaling, and/or blending. The deblocker 301 may, for example, receive encoding type information from the CPU 302. For example, the CPU 302 may determine whether the present macroblock pair was encoded utilizing frame or field coding and pass that information to the deblocker 301. Similarly, the deblocker 301 may also receive encoding type information from the CPU 302 as it relates to a preceding macroblock pair. Referring again to FIGS. 2A-2D, the deblocker 301 may receive from the CPU 302 information regarding macroblock encoding types that may apply to the present macroblock and/or to a previous macroblock.

The deblocker 301 may then, for example, utilize the determined encoding information and knowledge of the block combination scenarios, as illustrated in FIGS. 2A-2D, for example, to locate pixel information stored in the memory module 303 from the preceding macroblock pair that corresponds to left side pixel information of the present macroblock pair. The deblocker 301 may, for example, make such a determination in a variety of ways. The deblocker 301 may, for example, be hardwired to perform such processing with hardware. Alternatively for example, the deblocker 301 may utilize a CPU 302 executing software instructions that may perform a table lookup operation to determine a memory address of a desired piece of video information. Such a lookup table may, for example, be hard coded, implemented in firmware, and/or stored in on-chip SROM. For example and without limitation, the deblocker 301 may utilize MBAFF field and/or frame coding information to determine, or index to, an appropriate memory chart to utilize in obtaining appropriate left neighbor pixel information.

A deblocker, which is part of a video decoder, is also described in U.S. patent application Ser. No. 10/963,677 filed Oct. 13, 2004, which is hereby incorporated herein by reference in its entirety.

Figure 4:
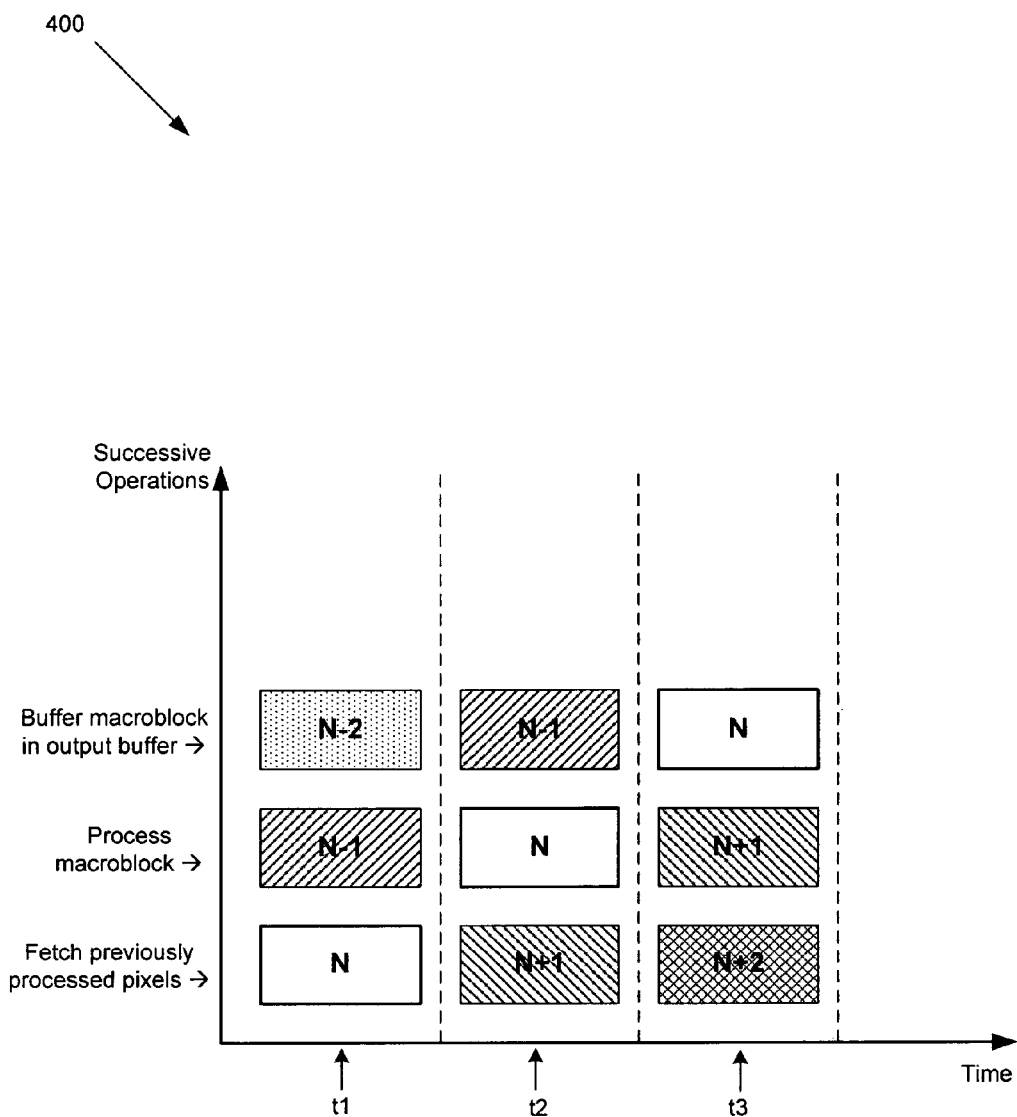
FIG. 4 is an exemplary timing diagram that illustrates utilization of an input buffer during deblocking, in accordance with an embodiment of the invention.

FIG. 4 is an exemplary timing diagram 400 that illustrates utilization of an input buffer during deblocking, in accordance with an embodiment of the invention. Referring to FIGS. 3 and 4, during processing time t1, previously processed pixels that may be necessary to deblock a current macroblock N may be fetched from the memory module 303 and stored in the first input buffer sub-module 337. During the same processing time t1, the filter 311 may be processing macroblock (N−1), while a processed, or deblocked, macroblock (N−2) may be buffered in the first output buffer sub-module 341.

During processing time t2, the filter 311 may be processing macroblock N utilizing the fetched previously processed pixels buffered in the first input buffer sub-module 337. While the filter 311 is processing macroblock N, previously processed pixels necessary to deblock a subsequent macroblock (N+1) may be simultaneously fetched and stored in the second input buffer sub-module 339. In addition, deblocked macroblock (N−1) may be simultaneously buffered in the first output buffer sub-module 341.

During processing time t3, the filter 311 may be processing macroblock (N+1) utilizing the fetched previously processed pixels buffered in the second input buffer sub-module 339. While the filter 311 is processing macroblock (N+1), previously processed pixels necessary to deblock a subsequent macroblock (N+2) may be simultaneously fetched and stored in the second input buffer sub-module 339. In addition, deblocked macroblock N may be simultaneously buffered in the first output buffer sub-module 341.

Figure 5:
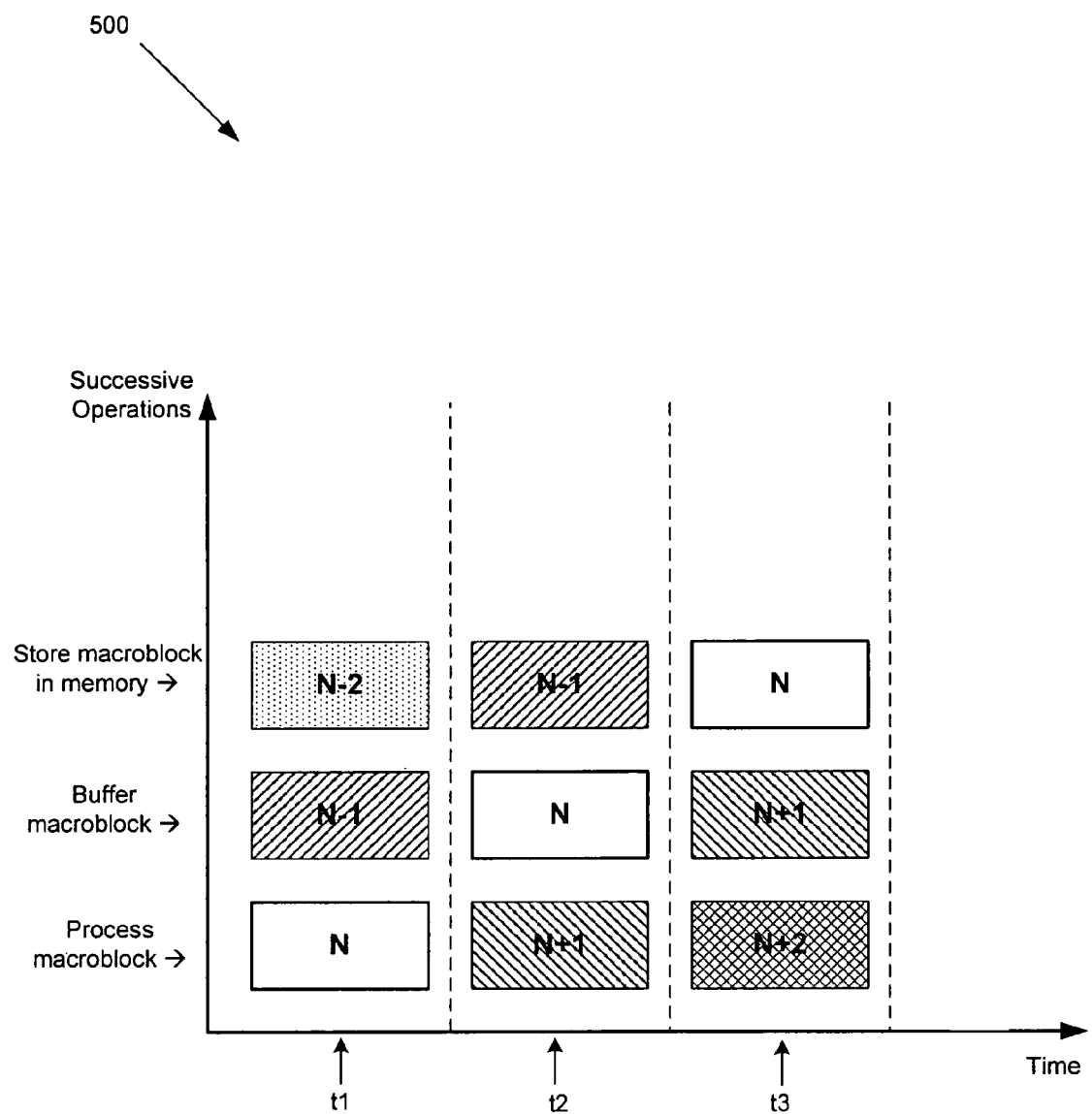
FIG. 5 is an exemplary timing diagram that illustrates utilization of an output buffer during deblocking, in accordance with an embodiment of the invention.

FIG. 5 is an exemplary timing diagram 500 that illustrates utilization of an output buffer during deblocking, in accordance with an embodiment of the invention. Referring to FIGS. 3 and 5, during processing time t1, current macroblock N may be processed by the filter 311. During the same processing time t1, a previously deblocked macroblock (N−1) may be simultaneously buffered in the first output buffer sub-module 341, and a previously deblocked macroblock (N−2) may be simultaneously communicated from the second output buffer sub-module 343 to the memory module 303 for further processing.

Similarly, during processing time t2, a current macroblock (N+1) may be processed by the filter 311. During the same processing time t2, a previously deblocked macroblock N may be simultaneously buffered in the first output buffer sub-module 341, and a previously deblocked macroblock (N−1) may be simultaneously communicated from the second output buffer sub-module 343 to the memory module 303 for further processing.

During processing time t3, a current macroblock (N+2) may be processed by the filter 311. During the same processing time t3, a previously deblocked macroblock (N+1) may be simultaneously buffered in the first output buffer sub-module 341, and a previously deblocked macroblock N may be simultaneously communicated from the second output buffer sub-module 343 to the memory module 303 for further processing.

Figure 6:
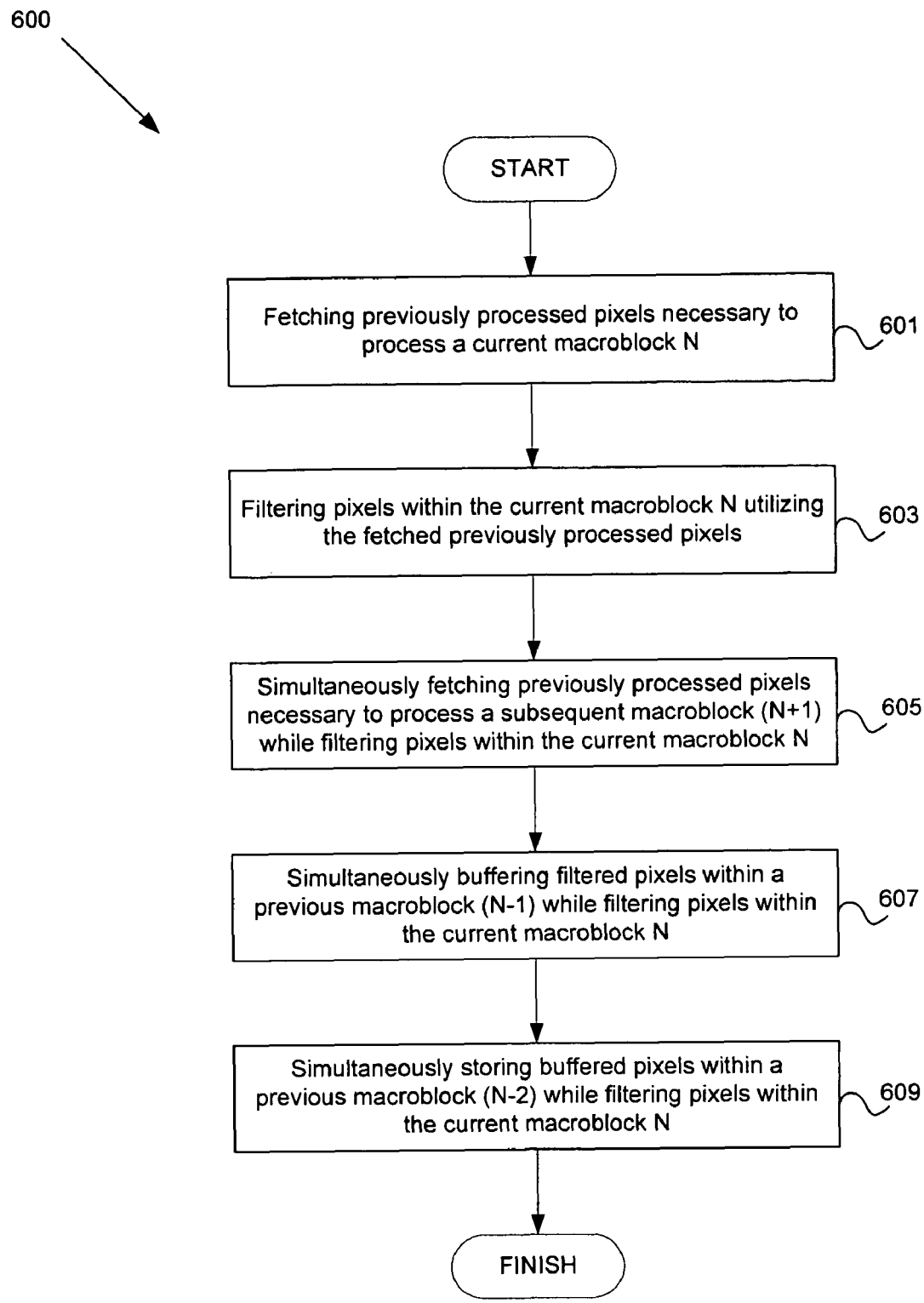
FIG. 6 is a flow diagram of an exemplary method for processing pixels along a horizontal edge within a current macroblock, in accordance with an embodiment of the invention.

FIG. 6 is a flow diagram of an exemplary method 600 for processing pixels along a horizontal edge within a current macroblock, in accordance with an embodiment of the invention. Referring to FIG. 6, at 601, previously processed pixels that may be necessary to process a current macroblock N may be fetched from off-chip memory, for example. At 603, pixels within the current macroblock N may be filtered utilizing the fetched previously processed pixels. At 605, previously processed pixels necessary to process a subsequent macroblock (N+1) may be simultaneously fetched while pixels within the current macroblock N are being filtered. At 607, filtered pixels within a previous macroblock (N−1) may be simultaneously buffered while filtering pixels within the current macroblock N. At 609, buffered pixels within a previous macroblock (N−2) may be simultaneously stored while filtering pixels within the current macroblock N.

Exemplary aspects of the present invention may incorporate aspects of MPEG-4 signal processing. Even though the present invention contemplates deblocking video signals that were processed utilizing MPEG-4 (e.g., MPEG-4 Part 10, H.264, AVC) signal processing, the MPEG-4 scenario is generally illustrative and should not limit the scope of various aspects of the present invention to characteristics of MPEG-4 and MPEG-4 signal processing. In this manner, video signals processed by other video processing methods may also be deblocked utilizing one or more aspects of the present invention.

Accordingly, aspects of the invention may be realized in hardware, software, firmware or a combination thereof. The invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

The invention claimed is:

1. A method for processing pixels, the method comprising:
    performing by one or more processors and/or circuits integrated within a single chip:
        buffering in said single chip, a first portion of a plurality of pixels, wherein said plurality of pixels were previously processed by said single chip;
        filtering along a first edge adjacent to a current macroblock using a filter in said single chip, a first portion of a plurality of selected pixels within said current macroblock utilizing said buffered first portion of said previously processed plurality of pixels; and
        concurrently buffering in said single chip, a second portion of said previously processed plurality of pixels, while filtering said first portion of said plurality of selected pixels within said current macroblock, wherein said concurrently buffered second portion of said previously processed plurality of pixels had previously been filtered along a second edge adjacent to said current macroblock using said filter.

2. The method according to claim 1, wherein said previously processed plurality of pixels comprise pixels within a macroblock pair adjacent to one of a vertical edge or a horizontal edge of said current macroblock.

3. The method according to claim 1, wherein said current macroblock comprises one or both of a frame coded macroblock and/or a field coded macroblock.

4. The method according to claim 1, comprising horizontally or vertically filtering by said filter, a second portion of said plurality of selected pixels within said current macroblock utilizing said buffered second portion of said previously processed plurality of pixels.

5. The method according to claim 4, comprising rotating in said single chip, said horizontally or vertically filtered second portion of said plurality of selected pixels within said current macroblock.

6. The method according to claim 1, comprising buffering in said single chip, said filtered first portion of said plurality of selected pixels within said current macroblock.

7. The method according to claim 6, comprising concurrently horizontally or vertically filtering by said filter, a second portion of said plurality of selected pixels within said current macroblock while buffering said filtered first portion of said plurality of selected pixels within said current macroblock.

8. The method according to claim 7, comprising storing in said single chip, said buffered first portion of said plurality of selected pixels within said current macroblock.

9. The method according to claim 8, comprising concurrently buffering in said single chip, said horizontally or vertically filtered second portion of said plurality of selected pixels within said current macroblock while storing in said single chip, said buffered first portion of said plurality of selected pixels within said current macroblock.

10. The method according to claim 1, comprising determining said first portion of said previously processed plurality of pixels for horizontally or vertically filtering said first portion of said plurality of selected pixels within said current macroblock.

11. The method according to claim 1, comprising concurrently horizontally or vertically filtering by said filter, a previous portion of a plurality of selected pixels within a previous macroblock while buffering said first portion of said previously processed plurality of pixels.

12. The method according to claim 1, wherein said first edge and said second edge are perpendicular to each other.

13. The method according to claim 1, comprising rotating in said single chip, said filtered first portion of said plurality of selected pixels within said current macroblock.

14. A non-transitory computer-readable medium encoded with computer executable instructions for performing a method for processing pixels, comprising:
    buffering in a single chip, a first portion of a plurality of pixels, wherein said plurality of pixels were previously processed by said single chip;
    filtering along a first edge adjacent to a current macroblock using a filter in said single chip, a first portion of a plurality of selected pixels within said current macroblock utilizing said buffered first portion of said previously processed plurality of pixels; and concurrently buffering in said single chip, a second portion of said previously processed plurality of pixels, while filtering said first portion of said plurality of selected pixels within said current macroblock, wherein said concurrently buffered second portion of said previously processed plurality of pixels had previously been filtered along a second edge adjacent to said current macroblock using said filter.

15. The non-transitory computer-readable medium according to claim 14, wherein said previously processed plurality of pixels comprise pixels within a macroblock pair adjacent to one of a vertical edge or a horizontal edge of said current macroblock.

16. The non-transitory computer-readable medium according to claim 14, wherein said current macroblock comprises one or both of a frame coded macroblock and/or a field coded macroblock.

17. The non-transitory computer-readable medium according to claim 14, comprising code for horizontally or vertically filtering by said filter, a second portion of said plurality of selected pixels within said current macroblock utilizing said buffered second portion of said previously processed plurality of pixels.

18. The non-transitory computer-readable medium according to claim 17, comprising code for rotating in said single chip, said horizontally or vertically filtered second portion of said plurality of selected pixels within said current macroblock.

19. The non-transitory computer-readable medium according to claim 14, comprising code for buffering in said single chip, said filtered first portion of said plurality of selected pixels within said current macroblock.

20. The non-transitory computer-readable medium according to claim 19, comprising code for concurrently horizontally or vertically filtering by said filter, a second portion of said plurality of selected pixels within said current macroblock while buffering said filtered first portion of said plurality of selected pixels within said current macroblock.

21. The non-transitory computer-readable medium according to claim 20, comprising code for storing in said single chip, said buffered first portion of said plurality of selected pixels within said current macroblock.

22. The non-transitory computer-readable medium according to claim 21, comprising code for concurrently buffering in said single chip, said horizontally or vertically filtered second portion of said plurality of selected pixels within said current macroblock while storing said buffered first portion of said plurality of selected pixels within said current macroblock.

23. The non-transitory computer-readable medium according to claim 14, comprising code for determining said first portion of said previously processed plurality of pixels for horizontally or vertically filtering said first portion of said plurality of selected pixels within said current macroblock.

24. The non-transitory computer-readable medium according to claim 14, comprising code for concurrently horizontally or vertically filtering by said filter, a previous portion of a plurality of selected pixels within a previous macroblock while buffering in said single chip, said first portion of said previously processed plurality of pixels.

25. The non-transitory computer-readable medium according to claim 14, wherein said first edge and said second edge are perpendicular to each other.

26. The non-transitory computer-readable medium according to claim 14, comprising code for rotating in said single chip, said filtered first portion of said plurality of selected pixels within said current macroblock.

27. A system for processing pixels, the system comprising:

at least one processor integrated within a single chip, said at least one processor being operable to buffer in said single chip, a first portion of a plurality of pixels, wherein said plurality of pixels were previously processed by said single chip;

said at least one processor being operable to filter along a first edge adjacent to a current macroblock using a filter in said single chip, a first portion of a plurality of selected pixels within said current macroblock utilizing said buffered first portion of said previously processed plurality of pixels; and said at least one processor being operable to concurrently buffer in said single chip, a second portion of said previously processed plurality of pixels, while filtering said first portion of said plurality of selected pixels within said current macroblock, wherein said concurrently buffered second portion of said previously processed plurality of pixels had previously been filtered along a second edge adjacent to said current macroblock using said filter.

28. The system according to claim 27, wherein said previously processed plurality of pixels comprise pixels within a macroblock pair adjacent to one of a vertical edge or a horizontal edge of said current macroblock.

29. The system according to claim 27, wherein said current macroblock comprises one or both of a frame coded macroblock and/or a field coded macroblock.

30. The system according to claim 27, wherein said at least one processor is operable to horizontally or vertically filter using said filter, a second portion of said plurality of selected pixels within said current macroblock utilizing said buffered second portion of said previously processed plurality of pixels.

31. The system according to claim 30, wherein said at least one processor is operable to rotate in said single chip, said horizontally or vertically filtered second portion of said plurality of selected pixels within said current macroblock.

32. The system according to claim 27, wherein said at least one processor is operable to buffer in said single chip, said filtered first portion of said plurality of selected pixels within said current macroblock.

33. The system according to claim 32, wherein said at least one processor is operable to concurrently horizontally or vertically filter using said filter, said second portion of said plurality of selected pixels within said current macroblock while buffering in said single chip, said filtered first portion of said plurality of selected pixels within said current macroblock.

34. The system according to claim 33, wherein said at least one processor is operable to store in said single chip, said buffered first portion of said plurality of selected pixels within said current macroblock.

35. The system according to claim 34, wherein said at least one processor is operable to concurrently buffer in said single chip, said horizontally or vertically filtered second portion of said plurality of selected pixels within said current macroblock while storing in said single chip, said buffered first portion of said plurality of selected pixels within said current macroblock.

36. The system according to claim 27, wherein said at least one processor is operable to determine said first portion of said previously processed plurality of pixels for horizontally or vertically filtering said first portion of said plurality of selected pixels within said current macroblock.

37. The system according to claim 27, wherein said at least one processor is operable to concurrently horizontally or vertically filter using said filter, a previous portion of a plurality of selected pixels within a previous macroblock while buffering in said single chip, said first portion of said previously processed plurality of pixels.

38. The system according to claim 27, wherein said first edge and said second edge are perpendicular to each other.

39. The system according to claim 27, wherein said at least one processor is operable to rotate in said single chip, said filtered first portion of said plurality of selected pixels within said current macroblock.

* * * * *